(12) United States Patent
Kindelan (10) Patent No.: US 8,967,508 B2
(45) Date of Patent: Mar. 3, 2015

(54) ELECTRIC FOOD PRESS PROCESSOR APPLIANCE

(75) Inventor: Robert Lyle Kindelan, Renton, WA (US)

(73) Assignee: Robert L. Kindelan, Renton, WA (US)

( * ) Notice: Subject to any disclaimer, the term of this patent is extended or adjusted under 35 U.S.C. 154(b) by 440 days.

(21) Appl. No.: 13/317,439

(22) Filed: Dec. 20, 2011

(65) Prior Publication Data

US 2013/0153696 A1    Jun. 20, 2013

(51) Int. Cl.
*B02C 25/00*    (2006.01)
(52) U.S. Cl.
USPC .................................. 241/34; 241/95; 99/510
(58) Field of Classification Search
CPC .................................... A47J 19/06; B30B 9/06
USPC ............... 241/36, 169, 169.1, 95, 34; 99/510, 99/513, 537
See application file for complete search history.

(56) References Cited

U.S. PATENT DOCUMENTS

| | | | | |
|---|---|---|---|---|
| 4,691,870 A | * | 9/1987 | Fukunaga et al. | 241/36 |
| 4,714,205 A | * | 12/1987 | Steinko | 241/95 |
| 6,896,214 B2 | * | 5/2005 | Wu | 241/169.1 |
| 7,946,222 B2 | * | 5/2011 | Webb | 99/349 |

* cited by examiner

*Primary Examiner* — Mark Rosenbaum
(74) *Attorney, Agent, or Firm* — Robert Kindelan (57) ABSTRACT

The present invention may be used to process various foods by pressing them through a receiving receptacle equipped with a processing disk. A body may have a plurality of platforms, frames and support configurations conducive for efficient function. A motor may be in the uppermost section of the body. A switch of choice may activate the motor and set in motion the press process. A ball bearing assembly and press assembly may complete the food press processing function. A receiving receptacle may receive produce for processing by the press plate and push produce through a processing disk, cup or sieve. A set of micro switches may serve to control the electric and mechanical function specific to the task. A press plate with configurations compatible to the disk selected may complete the process when the processed produce is dispensed into a dish or appropriate container.

11 Claims, 10 Drawing Sheets

56 designates the top platform and the line marks it as such 55 designates the top platform and the line marks it as such

Upper Micro Switches

Fig. 6

Lower Micro Switches

ELECTRIC FOOD PRESS PROCESSOR APPLIANCE

BACKGROUND OF THE INVENTION

1. Field of the Invention

This invention relates to electric food preparation and processing food material into various shapes and textures. This invention combines manual and electric powered food preparation as the exclusive method thereby eliminating manual effort as the singular method to achieve desired outcome. Specifically this invention relates to a significantly different processing system wherein food material is pressed vertically and combined with a broad array of attachments the results lead to ease in processing food materials into shapes and textures both beneficial and convenient.

2. Description of the Prior Art

In the past and present, food processors typically rotate horizontally using cutters, slicers and shredding disks or blade attachments to facilitate various repetitive tasks in the preparation of food. To achieve that end a number of parts are incorporated rather than a fixed blade. The present technology is limiting in some respects as some foods to be processed require said processor's parts and attachments to be disassembled to remove incompatible food materials before a different can be processed. The history of the food processor dates back to Germany in 1946 and later a French citizen noted a large amount of time in the kitchen chopping, shredding and mixing and a new addition was born, the bowl with a revolving blade.

Electric food processors of the type described in the field of the Invention sector have been largely classified into several kinds based on mechanical, structural and electric variances. Essentially the processing aspect involves food material subjected to cutting by a horizontal disk-cutter driven rotationally by a motor within a structural containment apparatus. One kind of which is referred to as a storage type which accommodates the cut pieces within a bowl to collect processed food material, while the other kind is called a cut piece discharge type which is arranged to discharge the cut pieces out of the container.

In the known electric food processor of the type described, the food processor of the processed discharge type adapted to discharge the food materials out of the container has been generally constituted by a main body in which an electric motor is incorporated, a container placed on the main body, a disk shaped attachment driven by an electric motor for rotation within the container, a disk member positioned below the cutter for rotation in the same direction as that of the cutter so as to discharge the cut pieces processed by the cutter out of the container, a container cover of an opening, and a pusher for pressing food material to be cut towards the cutter through a cylindrical feed tube or charge port provided in part of said container lid, etc. Moreover, the disk-shaped cutter and the disc member for discharging the cut pieces may be adapted to be replaced by an S-shaped cutter so as to enable cutting or shredding within the container.

The conventional electric food processor of the cut piece discharge variety constructed in the above expressed way is capable of continuously effecting a large amount of cutting without being limited by the size of the container, but there has been such an inconvenience that the material to be processed must be preliminarily cut into small pieces for pushing through the cylindrical charge port of the food processor. Another disadvantage in the known food processor as described above is such that, although it is preferable to rotate the disk-like cutter at low speed to prevent the cut pieces from losing shape, performance of the food processor is undesirably lowered particularly during use of the S-shaped cutter as referred to above.

SUMMARY OF THE INVENTION

The present invention obviates the drawbacks and difficulties that exist in prior art devices and provides a relatively simple, convenient, reliable and efficient way of processing food material.

Briefly, in the preferred embodiments disclosed herein, the present invention relates to an electrically-driven food press processor. The mechanical components are activated through a number of initial activation switches, printed circuit board and micro switches. The Initial Activation Switches start the press process electrically and rely on the printed circuit board as a way of eliminating some of the wiring normally found in some small appliances, plus the circuit board signals if an electric component malfunctions. The micro switches activate or deactivate electric current but have no control to initiate press activity on its own. The press components including one horizontal press plate comprise three vertical components, a central shaft and two vertical stabilizing rod and are named the press assembly. The press assembly is activated by a switch from an externally placed bank of switches. The motor, activated by an ascend of descend switch, starts the press process activating the press assembly and the food material having been placed in the receiving receptacle is pressed through a sieve, cutter, dicer, masher, juicer or some other designated attachment chosen for the press processing task.

The foregoing and other features and advantages of the present invention will become better understood with reference to the following drawings, description, claims and abstract.

BRIEF DESCRIPTION OF THE DRAWINGS

FIG. 4. Illustrates in a New Sheet a perspective of the ball bearing assembly. This is shown on a New Sheet and demonstrates the relationship between the ball bearing assembly, the vertical shaft, the inner race of the ball bearing, and the way the shoulder of the vertical shaft serves to become an abutment that secures the inner race to the vertical shaft wherein they become the driving force the motor utilizes to descend the press assembly to successfully complete its mission of processing food material through a strictly vertical press process.

DETAILED DESCRIPTION

The following detailed description represents the best currently contemplated modes of carrying out the invention. The description is not to be taken in a limiting sense, but made merely for the purpose of illustrating the general principles of the invention.

Figure 1A:
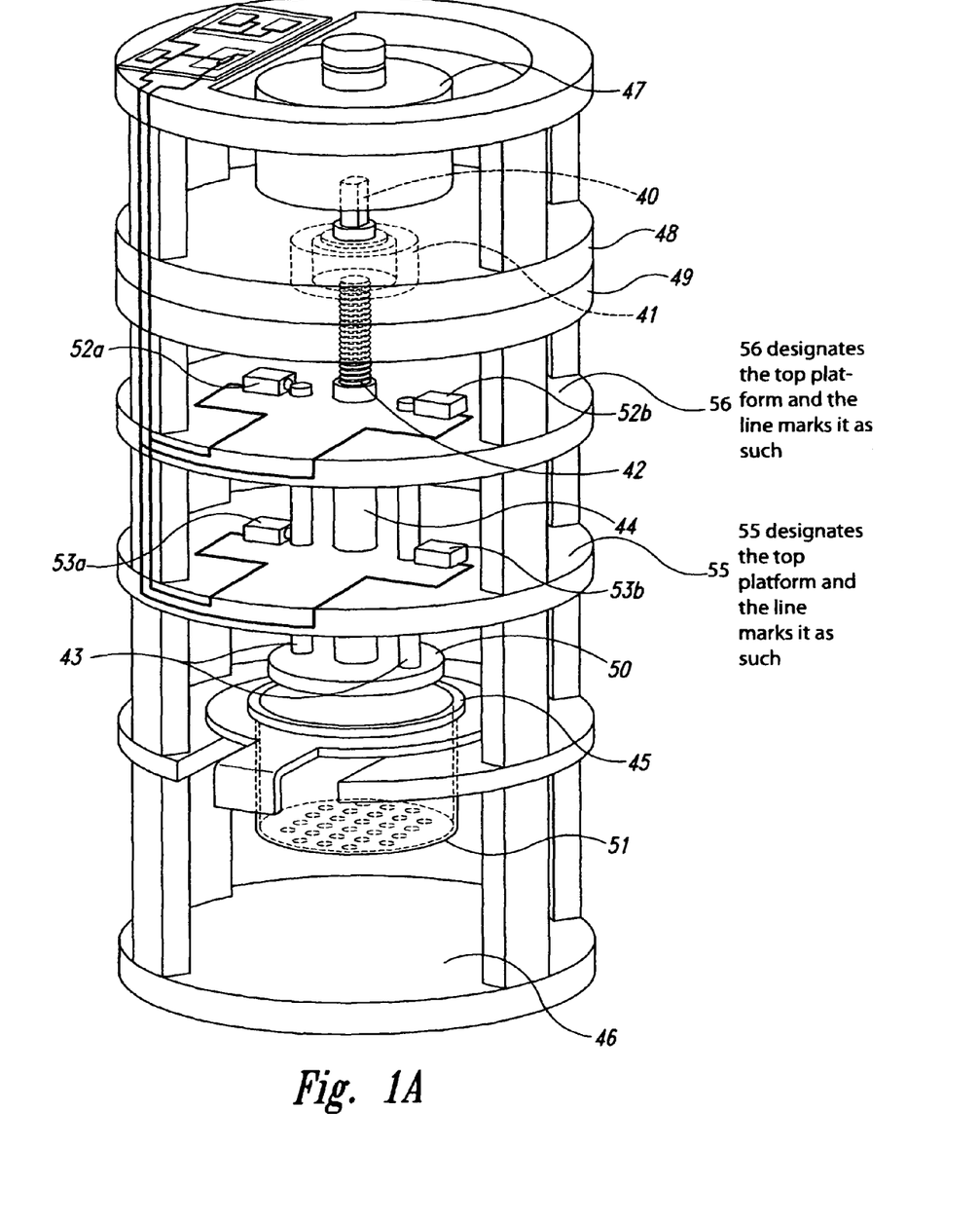
FIG. 1A. Illustrates the perspective view of the electric food press processor according to the embodiment of the invention. The annotation included in the drawing, 1/9, describe the changes and show the original drawing and the annotated drawing.
Figure 1B:
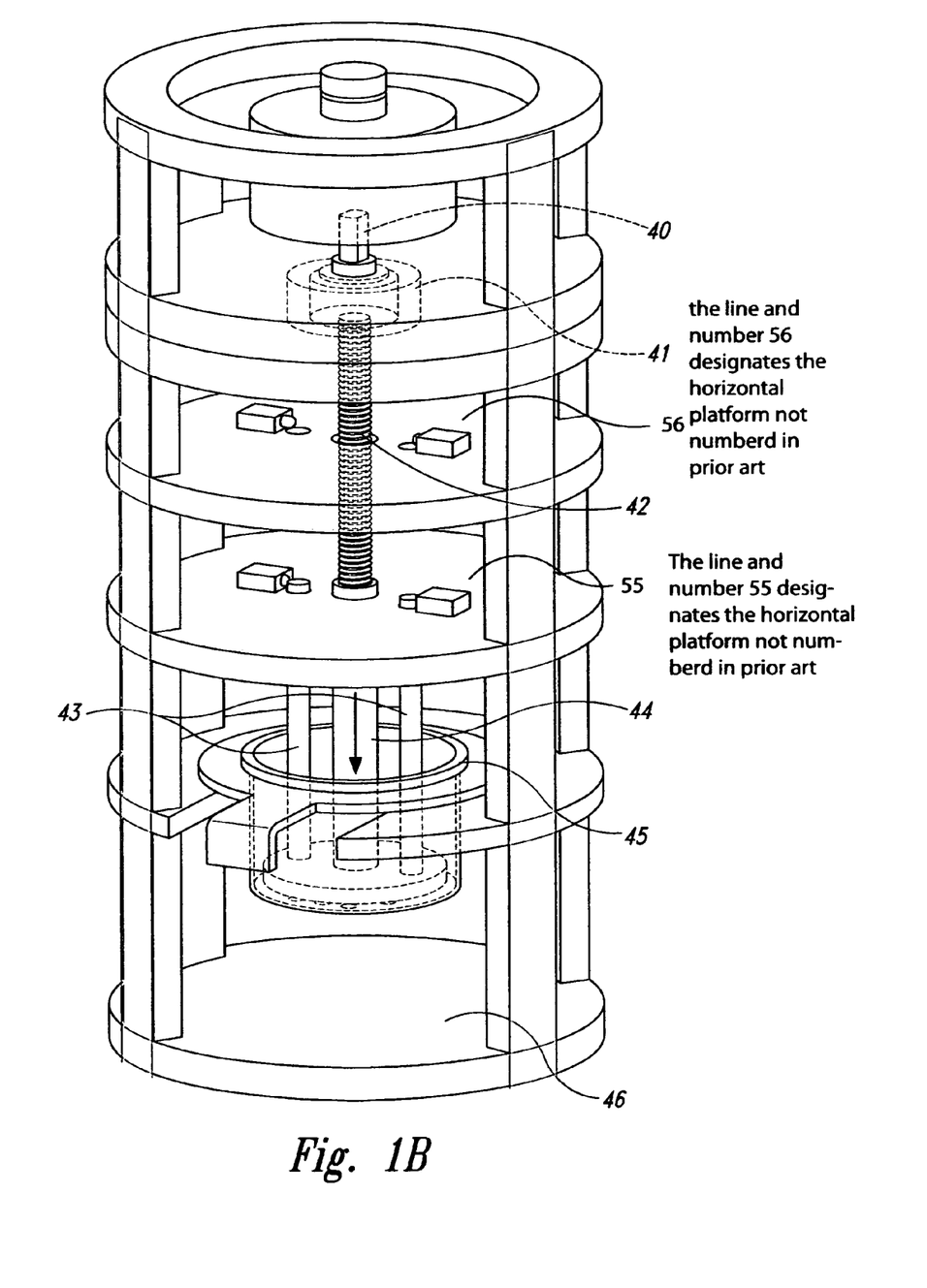
FIG. 1B. Illustrates another perspective of the electric food press processor according to the embodiment of the invention that illustrates a view of the press assembly making contact with the receiving receptacle, additionally, the annotations included in 2/9 specify those changes clarifying their relationship in later drawings and how they relate to the function of said press assembly.
Figure 2:
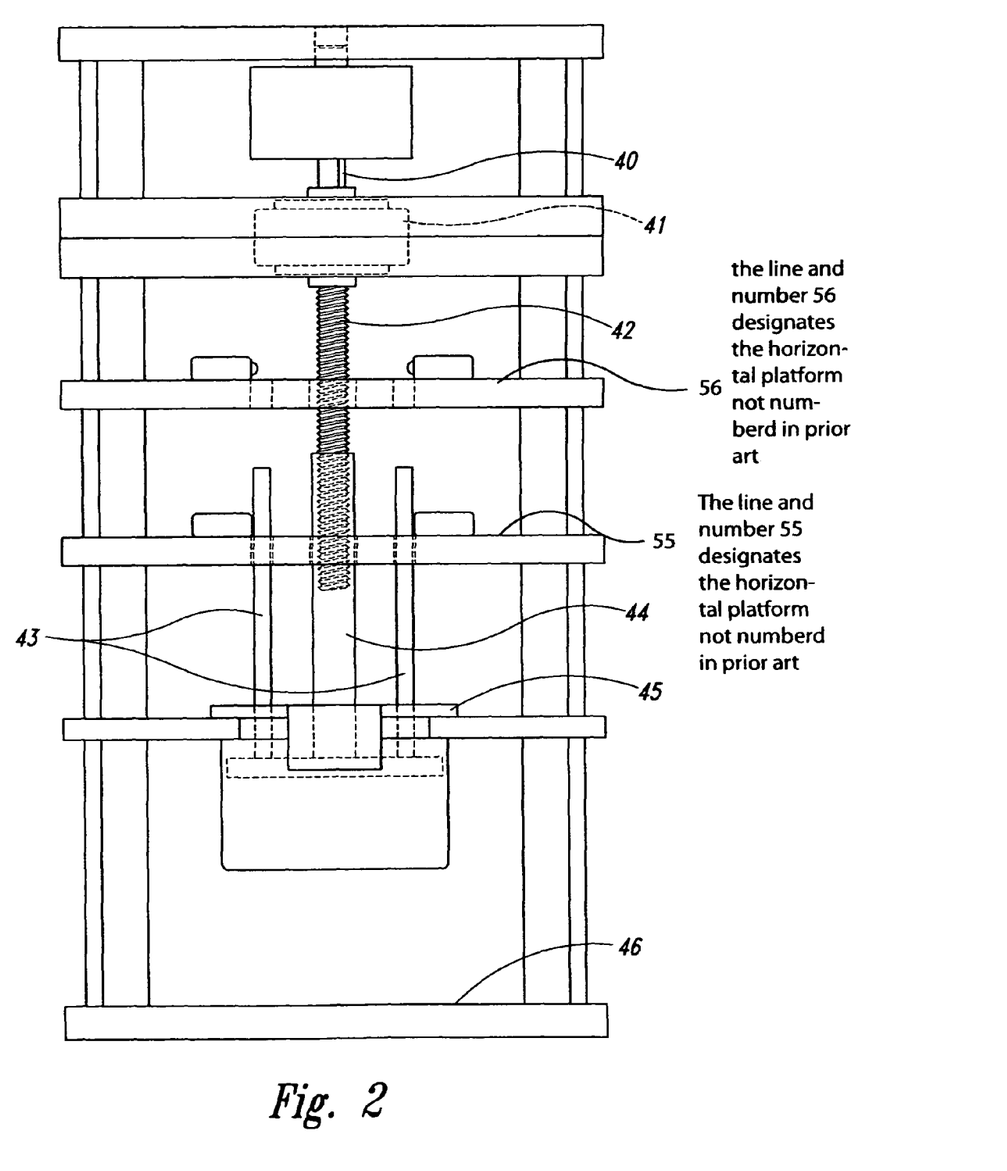
FIG. 2. Illustrates front view of the invention and includes similar annotation shown in 3/9 specific to press structure.
Figure 3:
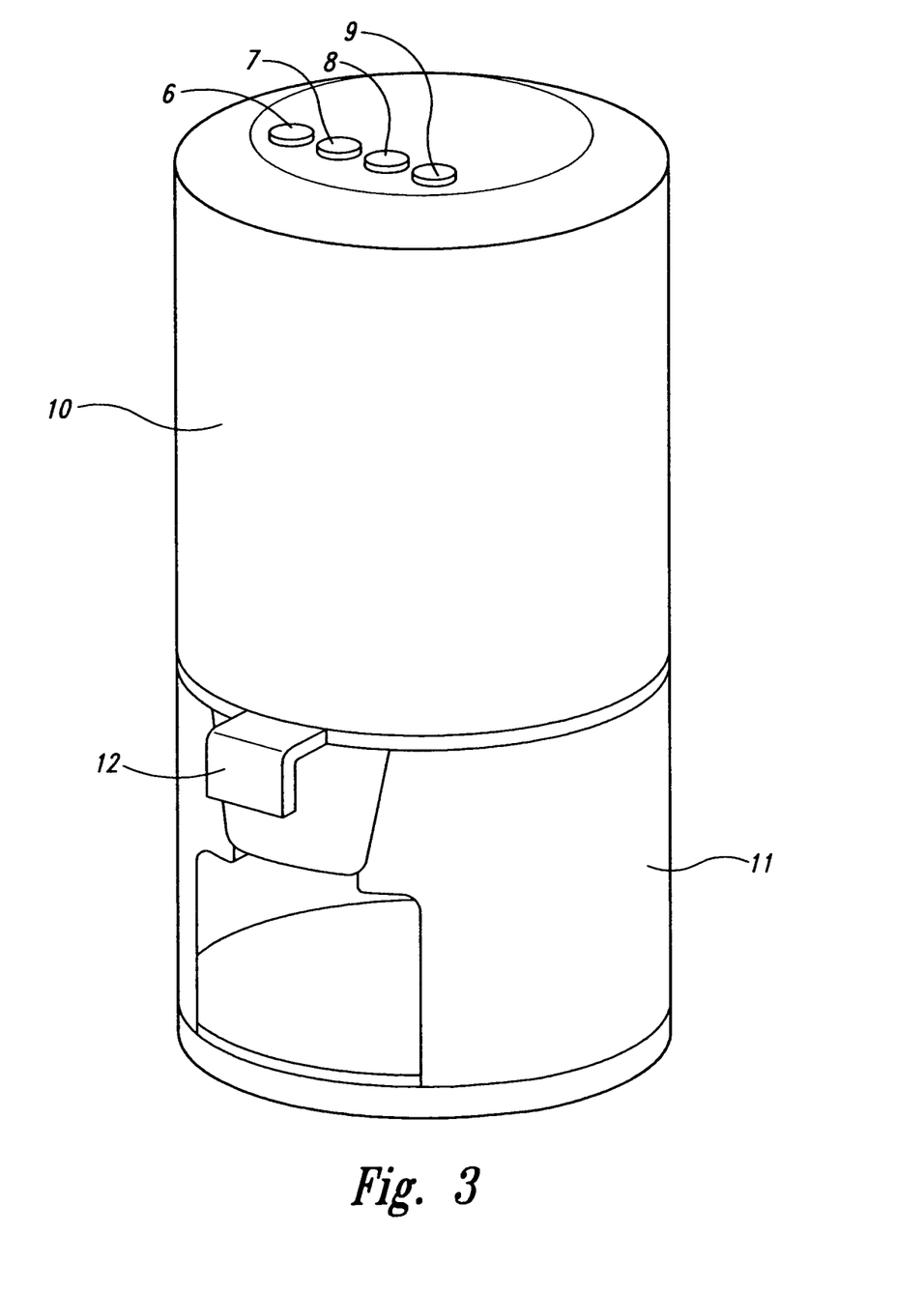
FIG. 3. Illustrates a perspective of the exterior of the invention and the singular annotation is the drawing number, 4/9.

Referring to FIG. 1A, the inner structure may be made of a sturdy material resistant to pressure and persistent mechanical movement and consist of horizontal platforms 48, 49 of high density material to contain the ball bearing assembly that takes the brunt of upward pressure as the press assembly makes contact with food placed in the food receiving receptacle 45, 51. When the press assembly 50, 43, 44 is activated into a descending action, the top of the stabilizing rods 43 allow the micro switches 52a, 52b to activate ascending current deactivated when the press assembly makes contact with the micro switch contacts 72 and recesses the contacts 72, thus in that specified recess the electric current is deactivated and cannot be activated automatically until a switch located at the top FIG. 3 is pressed. Electric current is deactivated when contact by the top of the stabilizing rods reaches the micro switch 70 and the contacts 72 are recessed. The micro switches are secured to the horizontal platform 56 so that the protruding button 73 in the micro switch is accessible to the outer vertical surfaces of the stabilizing rods 43. When descend is activated by a switch shown in FIG. 3 depicting the external electric food press processor and the row of push buttons 6, is activated, the stabilizing rods 43 in their descend mode glide downward past the contacts, FIG. 7, 75 that have been recessed in the micro switch 53a, 53b frame and the opposite occurs since ascend micro switch contacts FIG. 6, 79 protrude when active and are recessed 75 when electrically inactive. The micro switch function is specific, they activate and deactivate power that is controlled initially by the switches shown in FIG. 3, 6, 7, 8. 9 and cannot initiate activation on their own.

Figure 6:
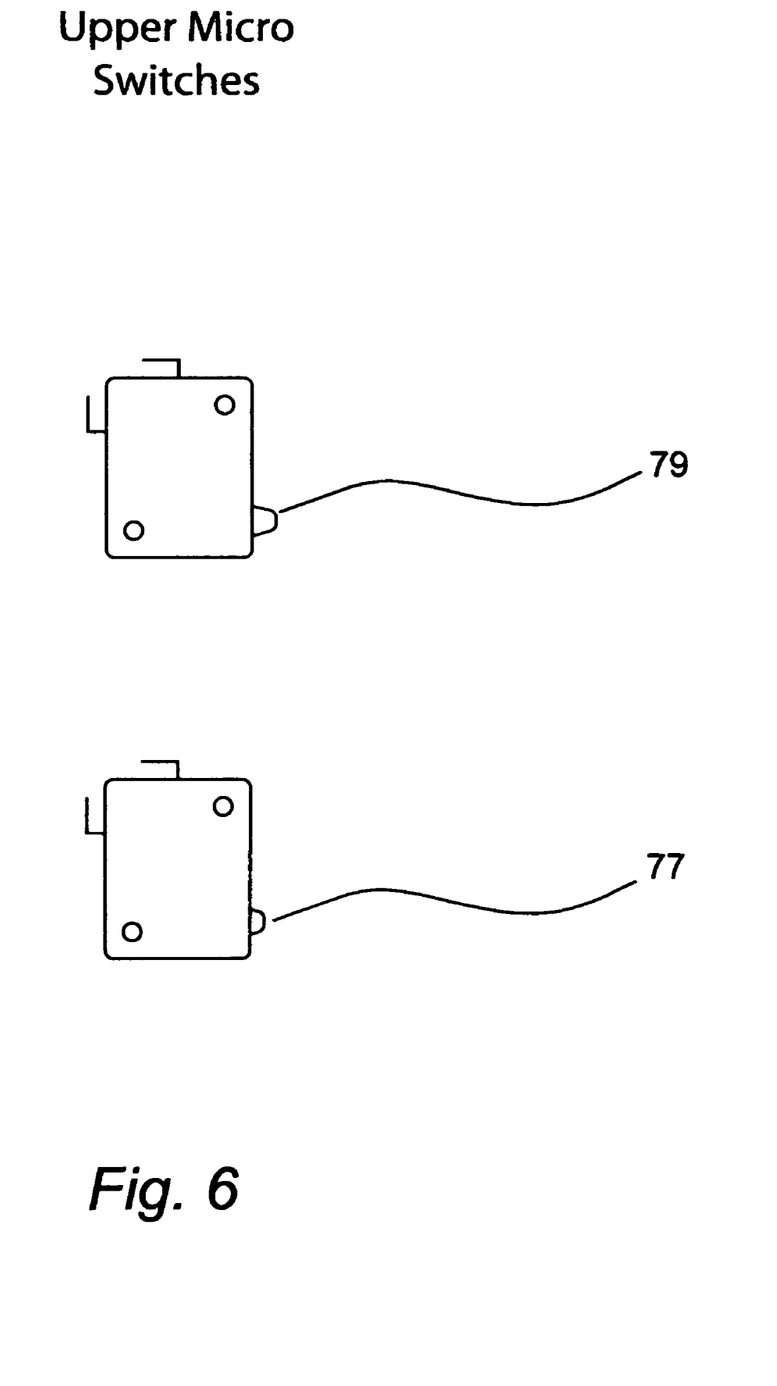
FIG. 6. Illustrates, in a New Sheet, a perspective of the micro switches for the ascending mode, thus they serve to end or start electric current but cannot activate vertical movement in either direct initially, they control electric current solely in either descend of ascend through activation switches placed externally.
Figure 7:
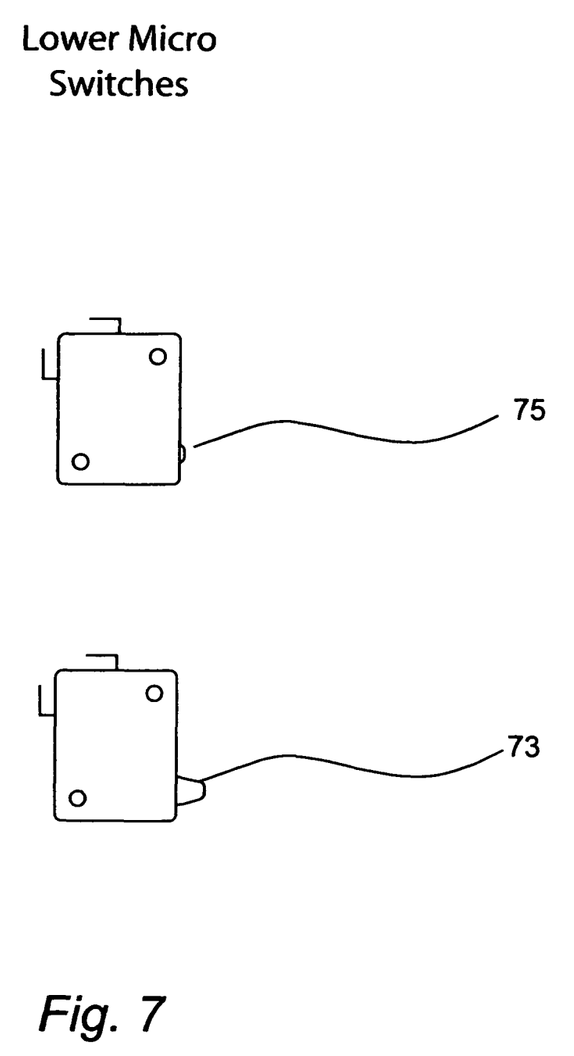
FIG. 7. Illustrates, in a New Sheet, a perspective of the micro switches for the descend mode, thus they serve to end or start electric current but cannot activate vertical movement in either direct initially, they control electric current solely in either descend of ascend through activation switches placed externally.
Figure 8:
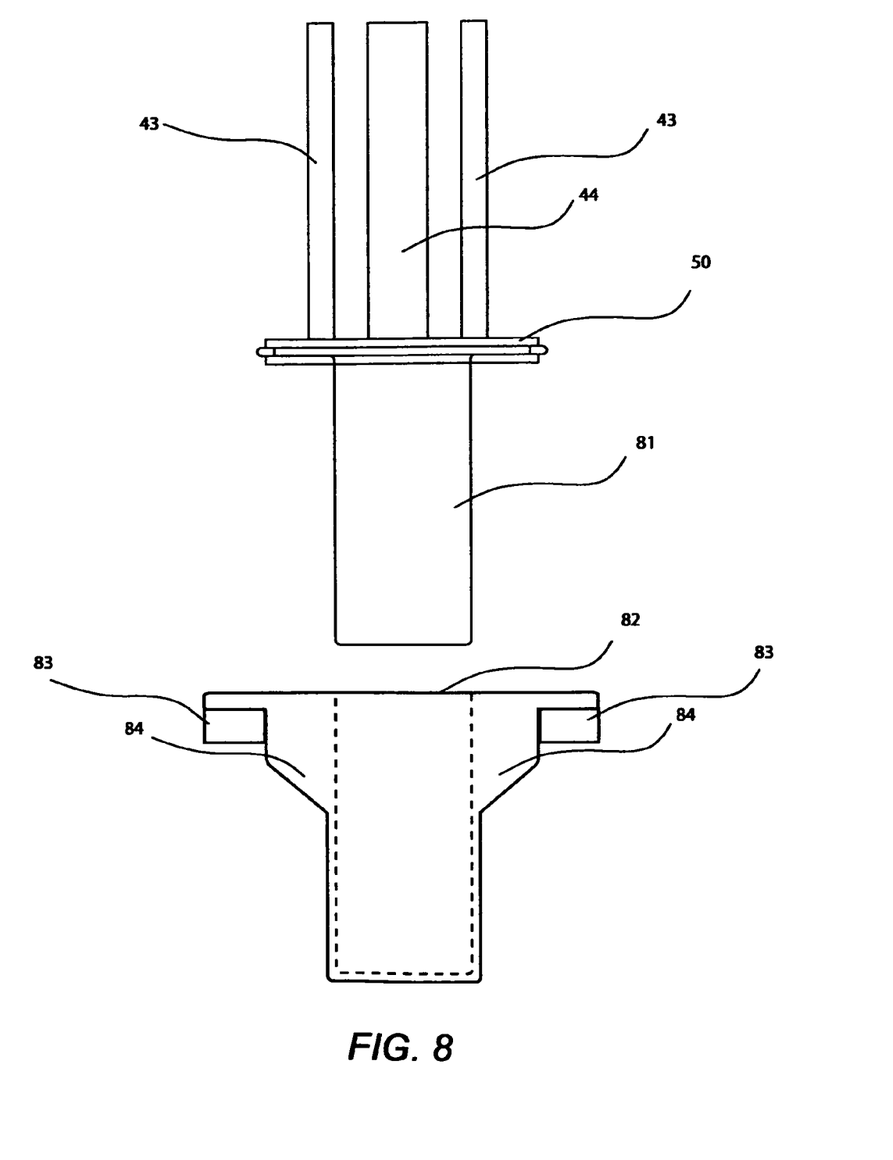
FIG. 8. Illustrates, in a New Sheet, a perspective of a reduced cup when a need for specific food items requiring more concentrated processing emerge.

The electric current is activated to ascend as the stabilizing rods 43 glide downward and the contacts FIG. 6 79 just inside the micro switches 52a, 52b protrude outward and the ascend current to the external switch FIG. 3, 6, 7, 8, 9 bank is activated as the stabilizing rods descend.

There are few steps involved when the electric food press is used. Illustrated in FIG. 3, switches 6, 7, 8, 9, of which one activates the descend action, one activates the ascend action, one to pause/start, and one to stop action as needed.

In FIG. 1A, the motor 47 when activated in whatever switch selection is made, rotates the shaft either clockwise or counterclockwise, depending on ascent switch selected, or descent switch selected, however ascend cannot be activated once the press assembly is in its most uppermost position. When the press assembly is in a power to start position, start meaning at the uppermost portion of the mechanical process as shown in FIG. 1A specifically showing 43, 44, 50 set to descend the press assembly 43, 44, 50 having been activated by contact with the micro switches 53a, 53b shown in FIG. 1A. The activation contact linked to the switch of descend 6 shown in FIG. 3 initiates activation of the food processor to descend. If the descend button 6 is accidentally pressed when the press assembly, FIG. 1A 43, 44, 50 is activated nothing will happen since the micro switch 53a, 53b see FIG. 1A, current after the top end of the stabilizing bars 43 are descending and the micro switches, FIG. 1A, 52a, 52b contacts, FIG. 7, 73 protrude in the full descend mode, current has been automatically activated to the ascend switch 7 shown in FIG. 3.

In FIG. 1A, below the motor 47 is its connecting shaft merged to the threaded rod 42. The threaded rod 42 is secured within the ball bearing assembly 41 inner race 67 which is secured by an upper collar 62, FIG. 4, kept secure to the inner race 67 by a nut 66 and lock washer 64 shown in FIG. 4.

Figure 4:
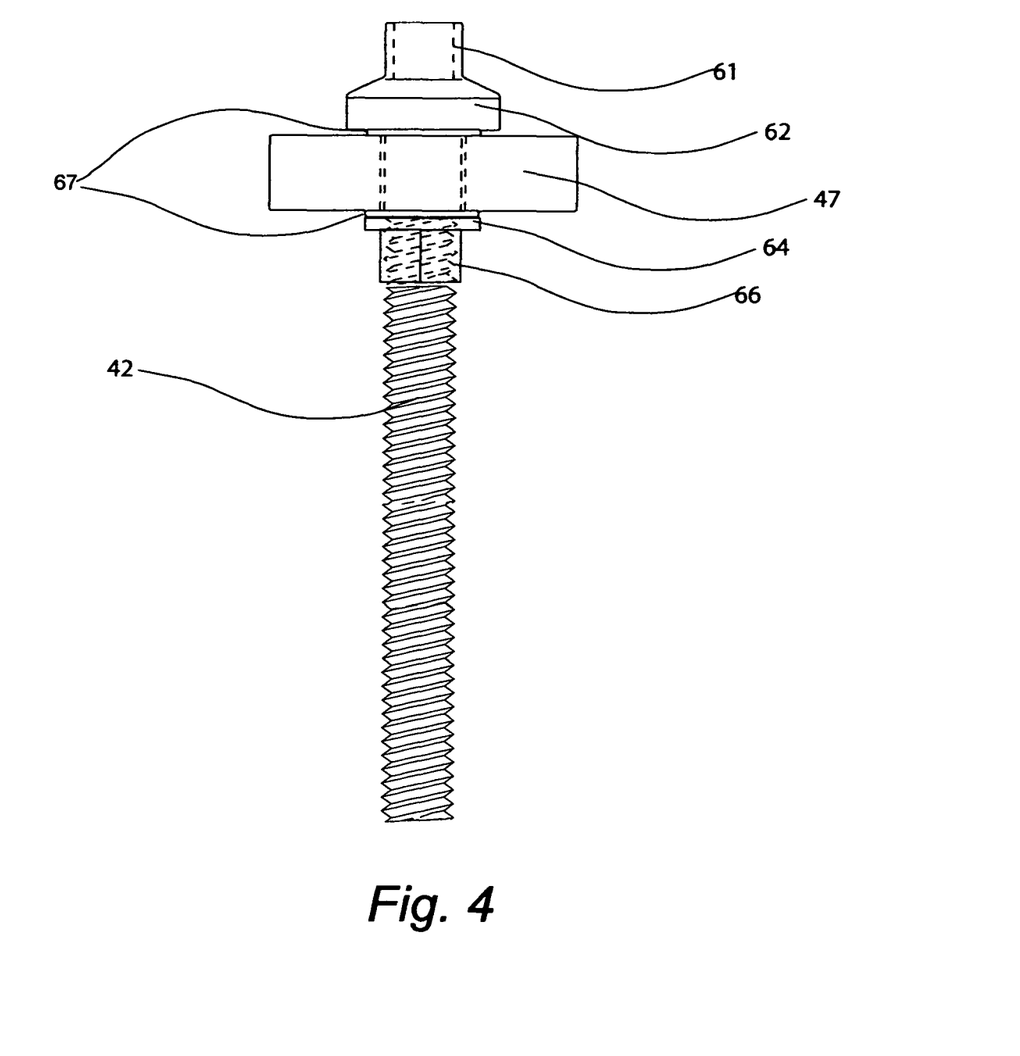
Figure 5:
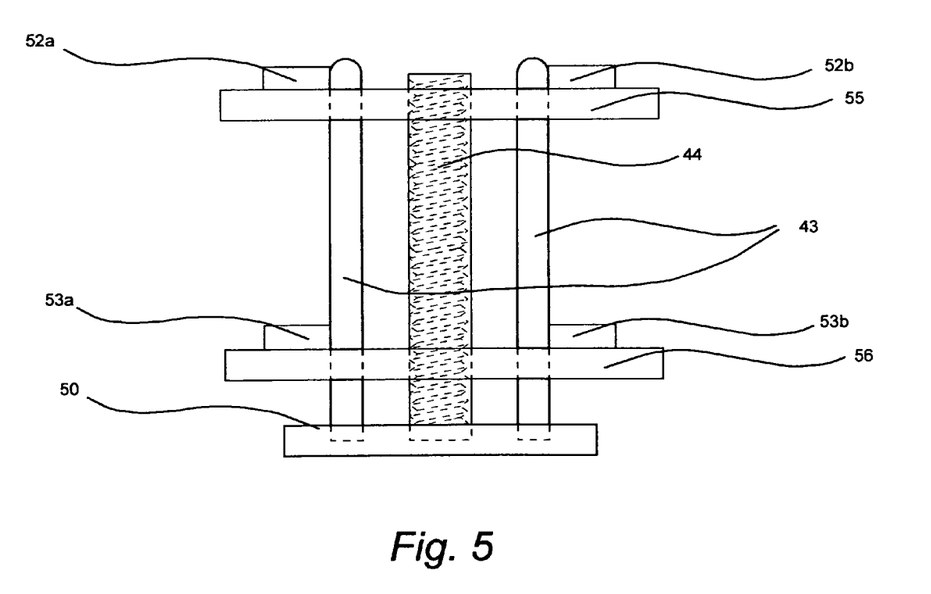
FIG. 5. Illustrates, in a New Sheet, a perspective of the press assembly in the clearest possible way and how the horizontal platforms, both upper and lower, serve to stabilize the press assembly function.
Figure 9:
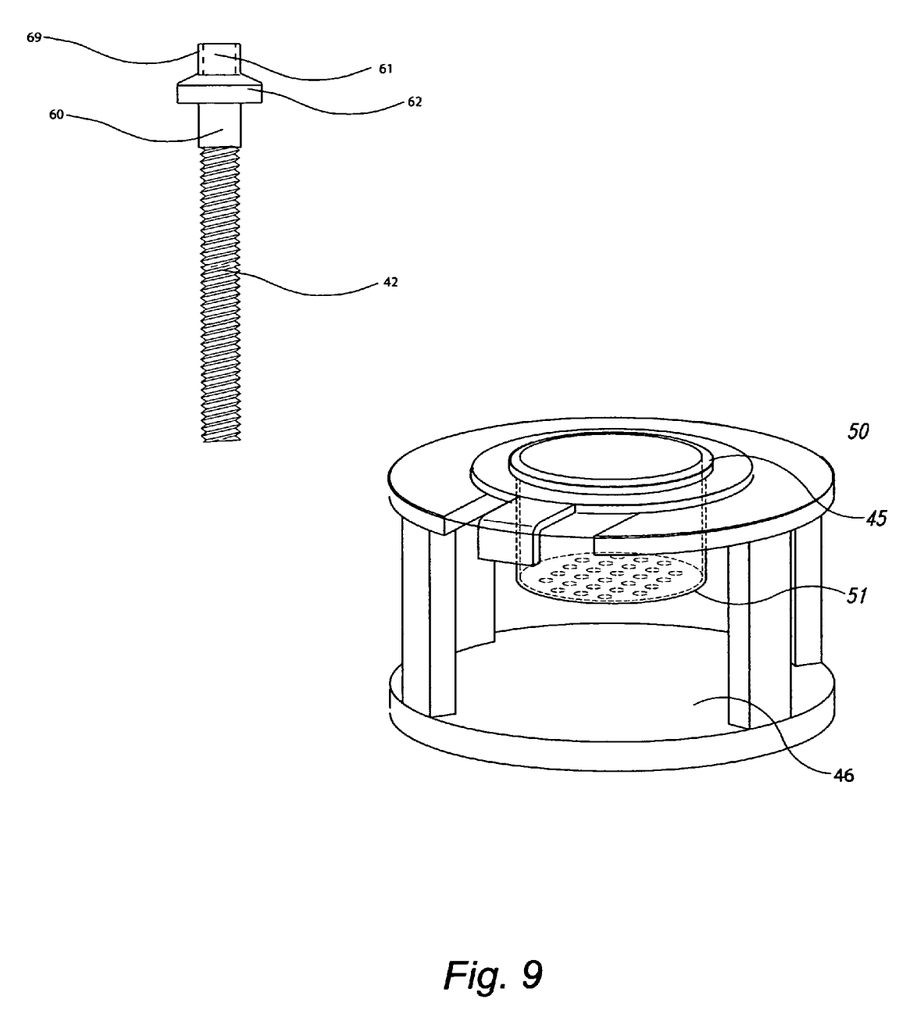
FIG. 9. Illustrates, in a New Sheet, a perspective of the receiving receptacle, the mesh sieve, and the base platform thus simplifying processing.

Horizontal platforms 48, 49 FIG. 1A contain the ball bearing assembly 41 outer race making it immobile which frees the inner race, FIG. 4 making the inner race 67 free to rotate whenever an activation demand is selected. The horizontal platform 48, 49 in FIG. 1A are secured to the frame body in several ways using hardware components and strategically placed vertical braces to prevent upward pressure when the press assembly 43, 44, 50, FIG. 1A pressing downward against food placed into the receiving receptacle 51 FIG. 9 from becoming a malfunction issue as the cellulose density of produce is not such that it can overcome the material density of the food processor body structure.

In FIG. 1A, the circuit board 57 is directly wired to the micro switches 52a, 52b, 53a, 53b, and the external activation switches 6, 7, 8, 9, FIG. 3, and is like a traffic controller in that it replaces multiple wiring and activates current as activation sources are contacted.

In FIG. 1A, the receiving receptacle 51 is filled partially of yet to be processed food items, after the press assembly has completed its task the food selected is pushed through the cup or processing disk by configured spine like projections that push through and past the dicing, slicing, meshing, cubing or juicing processing receptacle and force the processing result onto the bottom platform 46 FIG. 1A or into an appropriate container chosen by the food preparer.

In FIG. 4, the externally threaded rod's collar 62, and washer 64 and nut 66 keep the upward pressure when the press is in descend mode from overcoming the ball bearing assembly 41 while the platforms 48,49 keeps the ball bearing assembly 41 in a containment mode. The outer race is checked by the containment platforms 48, 49 FIG. 1A keeping the ball bearing assembly stable. The upper end of the threaded rod 65 is open 61 FIG. 4 and the shaft of the motor 47 FIG. 1A fits securely within its inner walls and may be held in place by a horizontal rod through the shaft and upper fitting.

While the invention has been fully shown and described with reference to the illustrated embodiments thereof, it will be understood by those skilled in the art that the foregoing and targeted changes in form and details may be made without departing from the character and scope of the invention.

The invention claimed is:

1. A food processor for pressing raw or cooked food into various shapes and textures comprising;

(a) a tubular body with a top, walls, a base;
(b) a bank of externally accessible switches at the top of said tubular body;
(c) four panels pressed into grooves located in an inner wall;
(d) a CPU adjacent to tubular wall located upon top horizontal panel;
(e) a ball bearing assembly between an upper horizontal panel and a lower horizontal panel;
(f) a ball bearing assembly securely compressed between said top horizontal panel and said lower horizontal panel;
(g) a central hole in upper and lower said horizontal panels specific enabling circular motion of ball bearing inner race of said ball bearing assembly;
(h) an outer threaded rod affixed to central race of said ball bearing assembly;
(i) said outer threaded rod affixed to motor shaft;
(j) outer ball bearing race securely compressed between said upper and lower horizontal panels;
(k) a internally threaded shaft compatible with said outer threaded rod, said rod and said shaft are activated by an external switch;
(l) a solid rod on each side of the internally threaded shaft, said internally threaded shaft, said rods and press plate form a press plate assembly;
(m) said press plate is configured to accept a variety of processing disks;
(n) additional horizontal panels spaced according to how high and how low the press plate assembly goes to meet the food processing requirement;
(o) said horizontal panels have three bored openings, one on each side of said central located holes specific to insure said press plate ascends and descends predictably;
(p) said outer holes said solid rods pass through are bored with close tolerance diameter of said solid rods, said central holes are bored with close tolerance of diameter of central shaft;
(q) a pair of micro switches on said top horizontal panel and a pair of said micro switches on said lower horizontal panel;
(r) said micro switches are equipped with actuators can be recessed when said solid rods make contact be it upward for ascend, downward for descend, conversely, and when said solid rods withdraw from micro switches, actuators protrude;
(s) or withdraw from as said press plate assembly descends or ascends adjacent to said solid rods;
(t) said micro switches have internal actuators and that when recessed power can be either deactivated or activated dependent on the micro switch specific function, descend or ascend;
(u) a receiving receptacle open at the top to receive various food, raw or cooked, said receptacle is but one of many, each configured for a specific purpose, to mash, mesh, cut, dice, slice or juice;
(v) said disk, of which there are several, can be positioned on said press plate, each tooled to fit its compatible said receiving receptacle's configuration;
(w) a frame with an inner circumference 1 mm larger than the circumference of said receiving receptacle, said receiving receptacle being pressed into said frame, said receptacle has a lip or rim that extends beyond circumference of said receptacle's circumference specific to press against the top rim of said frame;
(x) said frame surrounds said receiving receptacle, once done they are set upon a ledge located within the lower section of the tubular body specifically configured to withstand whatever pressure develops from the food press process.

2. A food processor as claimed in claim 1 wherein a plurality of horizontal grooves on each side of said tubular inner wall are specifically for securing said horizontal panels compressing said ball bearing assembly, for platforms said micro switches sit upon, for stabilizing said press plate assembly for descend and ascend predictability when activated.

3. The food processor of claim 2 wherein the press plate descends, as the solid rods withdraw from said upper micro switches ascend specific AC power is ready to use when selected.

4. The food processor of claim 1 wherein said bank of external switches determine which selection is made and a fail safe configuration is in place, should ascend be selected as a starter it will not function since the AC power is disabled until said micro switches specific to ascend become AC powered which can happen when said micro switches specific to ascend are reactivated and AC power is restored, when said press plate assembly's solid rods withdraw from said micro switches, conversely, descend cannot be activated until said lower micro switches actuators are recessed by said solid rods when ascend is activated, as descend had been deactivated as the press plate reached it completed processing level.

5. The food processor of claim 1 wherein said ball bearing assembly secured between an upper and lower panel, has a bored open circumference center where said inner race and said externally threaded rod passes through giving them free motion when activated.

6. The food processor of claim 1 wherein all panels are slotted into horizontal grooves of the inner tubular wall securing them securely in place specifically spaced for maximum efficiency.

7. The food processor of claim 1 wherein said press plate assembly descending toward said receiving receptacle and upon reaching the receptacle opening the result is dependent upon which receptacle and press plate disk were selected, once the resulting outcome begins the end of the solid rods will come into play, when said rods reach the space where said micro switch actuators are and pass them the actuator protrude and AC descend power ceases.

8. The food processor of claim 7 wherein the food pressed falls onto the inner floor of the base or is received in a container ending the food press process.

9. The food processor of claim 7 wherein the tip of said solid rods have deactivated descend and is now activated by said external switches, specifically ascend, once that begins the press plate assembly leaves said receiving receptacle's inner space, said press plate ascends, when the tips of the said solid rods reach said micro switches on said horizontal panel, they are recessed and AC power ceases, food processing is complete.

10. The food processor of claim 1 wherein the receiving receptacle is removed from said frame, wherein a receiving receptacle differently configured replaces a prior receptacle, a different disk is slid onto the press plate, this is done for pressing food into a shape desired, it ranges from slicing to mashing, as in potatoes, to juicing as in orange, lemon or lime, all is dependent on compatibility of said disks and said receptacles.

11. The food processor of claim 1 wherein said micro switches are secured to top surface of said panels, said upper and lower panel have three holes each, said inner threaded shaft uses the middle and larger holes, said solid rods pass through the outer and smaller holes, this configuration enables said rods and said shaft to descend and ascend smoothly and predictably, without this configuration they would not function in a predictable fashion, said micro switches schematic AC power is exact opposite for said micro switches relative to descend and said micro switches relative to ascend, said outer rods have rounded tops specific for when making contact with said actuators they depress within said micro switches; said solid rods are kept in their specific alignment position by holes in said horizontal platforms with close tolerance diameter holes said solid rods pass through when activated either upward or downward thereby stabilizing descend and ascend as required to accomplish said food press requirements.

* * * * *